T. B. ROBERTS.
Improvement in Cultivators.
No. 116,100. Patented June 20, 1871.
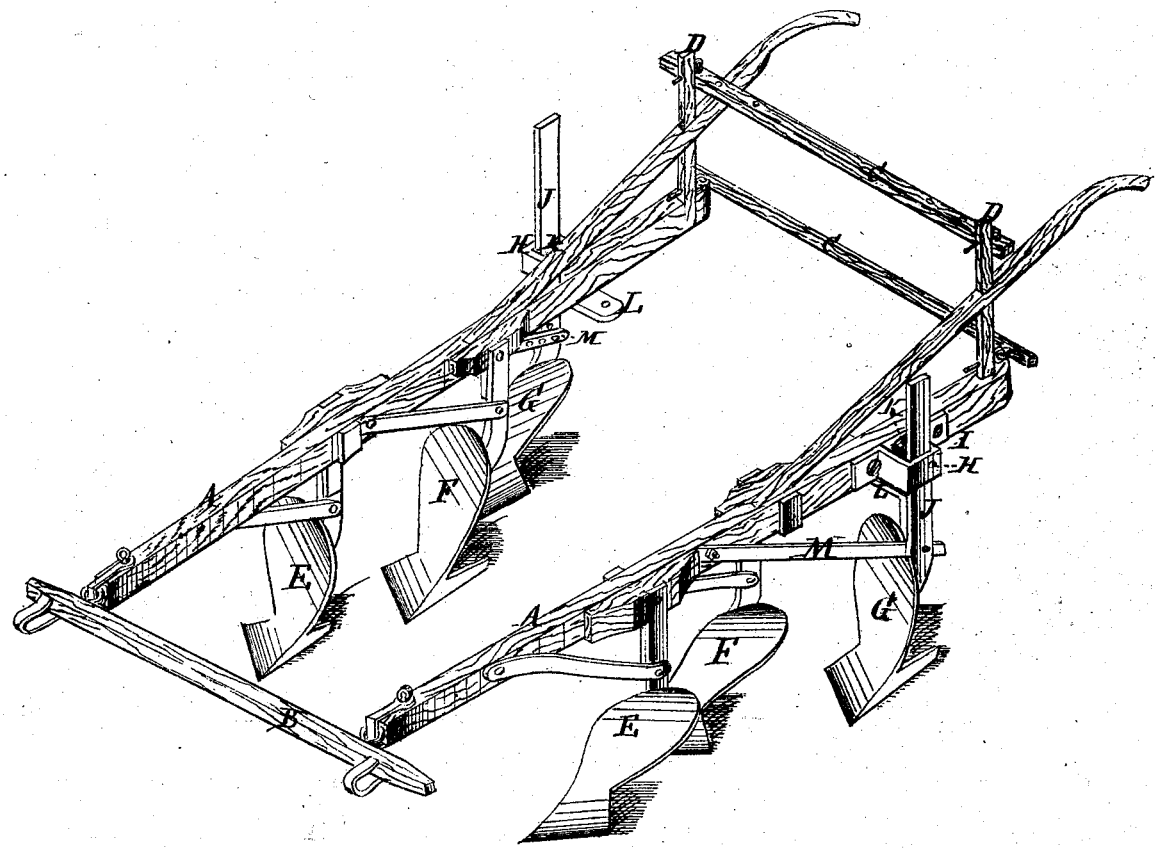
Witnesses:
M. Vorlaender
Wm. H. E. Smith
Inventor:
T. B. Roberts.
per [signature]
Attorneys.

116,100

UNITED STATES PATENT OFFICE.

THOMAS B. ROBERTS, OF FRANKLIN, ILLINOIS.

IMPROVEMENT IN CULTIVATORS.

Specification forming part of Letters Patent No. 116,100, dated June 20, 1871.

*To all whom it may concern:*

Be it known that I, THOMAS B. ROBERTS, of Franklin, in the county of Morgan and State of Illinois, have invented a new and useful Improvement in Cultivators; and I do hereby declare that the following is a full, clear, and exact description thereof, which will enable others skilled in the art to make and use the same, reference being had to the accompanying drawing forming part of this specification.

My invention consists in an improvement upon the straddle-row cultivators now in common use, which will be first fully described hereinafter and subsequently pointed out in the claim.

The figure is a perspective view of my improved cultivator.

A represents the plow-beams, which are yoked together at the front ends by the evener B and at the rear by the bars C and posts D, the said bars being detachably connected and arranged for shifting the connecting eye-bolts toward or from the center, for varying the distance of the plows apart and from the row of plants, which will be between them. The front plow E of each beam is attached to the beam so as to run near the middle of the space between the rows, and turns outward; the second plow, F, is attached so as to run closer to the row, and also turns outward; while the third and last plow, G, is attached so as to run near the middle of the row, and turns inward to throw the fresh earth turned up by the others back toward the row, to insure the covering of the roots of the plants laid bare by the plows F. These plows are also attached to the beams so as to be adjusted thereon toward or from the row, to vary them relatively to the others according to whether it is required to have more or less of the fresh earth turned back upon the roots. For making these adjustments the said plows are connected to the beams by the long bolts H, passing through their shanks J and the bent bars I into the beams, and also through the blocks K, which are shifted from side to side of the shanks, as required. Braces L and M are also employed for strengthening the connection of the plows G with the beams. The braces L are adjustably attached to the beams and permanently attached to the plows; and the braces M are permanently attached to the beams and adjustably to the plows. They may be varied, however, in these particulars, as may be preferred, and the mode of connecting them may be such as found best.

It is believed that these arrangements are calculated to adapt the plows to do better work than any now in use.

Having thus described my invention, I claim as new and desire to secure by Letters Patent—

A straddle-row cultivator having three turn-plows on each of two beams, the foremost two arranged to turn from the row of plants, and the hindmost one throwing the pulverized dirt back and up to the roots of the crop, as described.

THOMAS B. ROBERTS.

Witnesses:
JAMES M. COOK,
JAMES McDONNELL.